Dec. 14, 1943. E. V. STATIA, SR 2,336,758
GRINDING WHEEL TRUING DEVICE
Filed Sept. 26, 1942 2 Sheets-Sheet 1

Inventor
Edwin V. Statia Sr.
By Barthel & Bugbee
Attorneys

Dec. 14, 1943.                E. V. STATIA, SR                 2,336,758
                        GRINDING WHEEL TRUING DEVICE
                        Filed Sept. 26, 1942          2 Sheets-Sheet 2
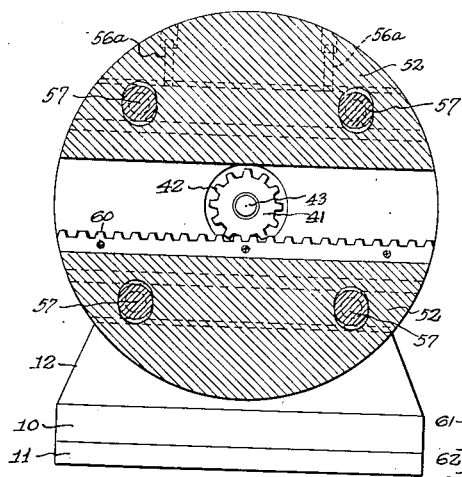
Fig. 4.
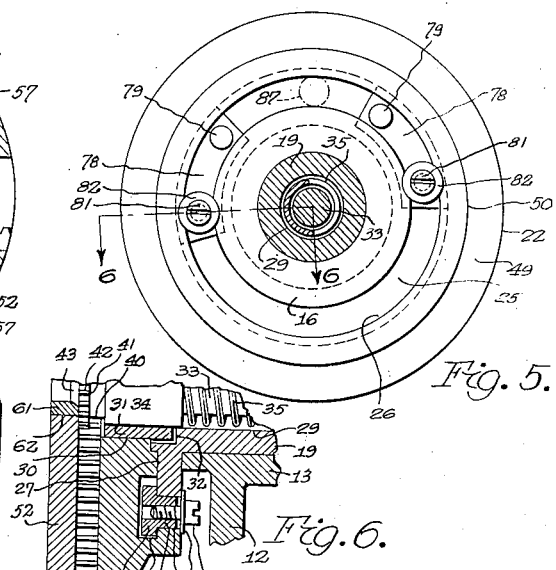
Fig. 5.
Fig. 6.
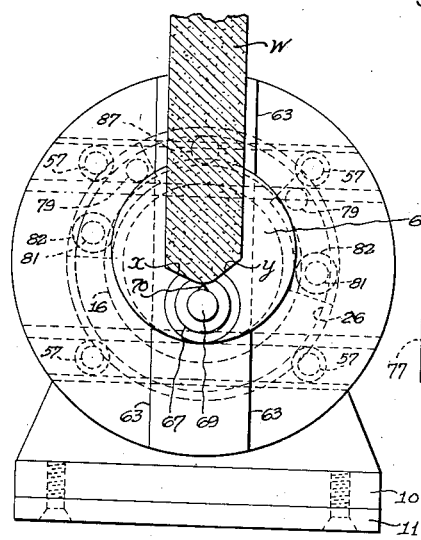
Fig. 8.
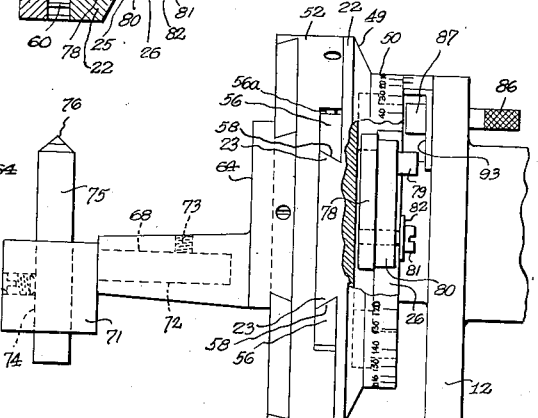
Fig. 10.
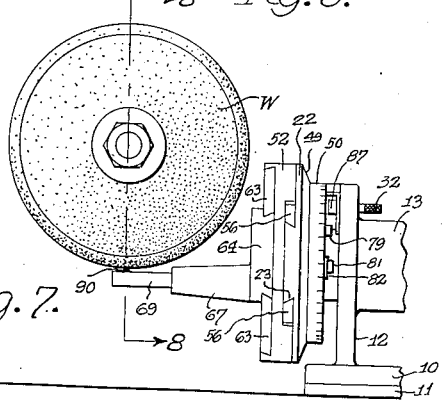
Fig. 7.
Fig. 9.
Inventor
Edwin V. Statia Sr.
By
Bartel & Bugbee
Attorneys Patented Dec. 14, 1943

2,336,758

UNITED STATES PATENT OFFICE 2,336,758

GRINDING WHEEL TRUING DEVICE

Edwin V. Statia, Sr., Detroit, Mich., assignor of one-half to Edward L. Chapman, Detroit, Mich.

Application September 26, 1942, Serial No. 459,800

13 Claims. (Cl. 125—11)

The present invention relates to improvements in tool holders, and more particularly to tool holders for use in dressing grinding wheels.

The primary object of the invention is to provide a tool holder which may be adjusted so that the tool will be presented to the periphery of a grinding wheel and dress the grinding wheel to the desired contour.

Another object of the invention is to provide a tool holder having a tool carrier adapted to be presented to the grinding wheel, which tool carrier may be shifted to the desired position by a sliding and rotary movement manually imparted to the tool carrier.

Another object of the invention is to provide a grinding wheel dressing tool holder having a rotatable head which may be adjusted to various angles so that the tool carrier may be moved in the direction of said adjusted angle to produce a contour on the grinding wheel embodying faces of two or more different angles.

Another object of the invention is to provide a tool holder having a rotary head provided with a slide having means for centering the slide and holding the same in a locked position coincident with the control for moving the slide.

Another object of the invention is to provide a tool holder of the above-mentioned character having a rotary head provided with adjustable stop members capable of being adjusted at various locations to limit the rotational movement of the head within certain angular limits dependent upon the angularity of the face or contour of the grinding wheel.

Another object of the invention is to provide a tool holder having a rotary head and a slidable tool carrier mounted thereon adapted to be controlled by concentric manual control shafts operable at one end of the tool carrier at a single manual control point.

Other objects and advantages of the invention will become apparent during the course of the following description of the accompanying drawings wherein:

Figure 4 is a vertical cross sectional view taken on line 4—4 of Figure 2 looking in the direction of the arrows illustrating the rack and pinion adjusting means for the rotary tool carrier head;

Figure 5 is a vertical cross sectional view taken on line 5—5 of Figure 2 looking in the direction of the arrows showing in detail the adjustable stop elements and the manner in which they may be circumferentially adjusted;

Figure 6 is a segmental sectional view of the rotary head taken on line 6—6 of Figure 5 looking in the direction of the arrows further illustrating in detail one of the adjustable stop members;

Figure 7 is a fragmentary side elevational view of the tool holder showing the manner in which it may be positioned with respect to a grinding wheel surface;

Figure 8 is an end elevational view of the tool holder further showing the manner in which the tool holder is adapted to be presented to the peripheral surface of the grinding wheel for the purpose of forming angular contoured walls thereon;

Figure 9 is an end elevational view of the tool holder showing the same presented to a grinding wheel for allowing the cutter to traverse the surface of the wheel when truing the grinding surface thereof; and Figure 10 is a fragmentary side elevational view of a tool holder embodying the invention showing an adapter for accommodating various forms of cutting and dressing tools.

Figure 1:
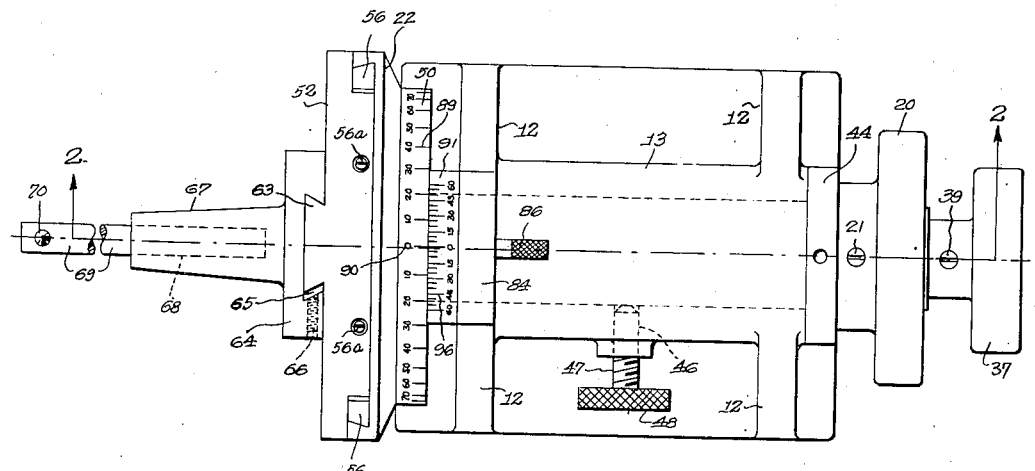
Figure 1 is a top plan view of the tool holder illustrating the vernier adjustment scale and showing the general arrangement of the device.

In the drawings, wherein for the purpose of illustrating the invention like reference characters will be employed to designate like parts throughout, the reference character 10 will generally be employed to designate a relatively flat base having a bottom surface plate 11 which is true and accurate so that the base may be positioned upon a work table or other trued support. Formed at each end of the base 10 is an upright 12 which is triangular in shape and terminates at the upper end in a tubular spindle support 13. The spindle support 13 connects the vertical uprights 12 and is formed integral therewith.

Figure 2:
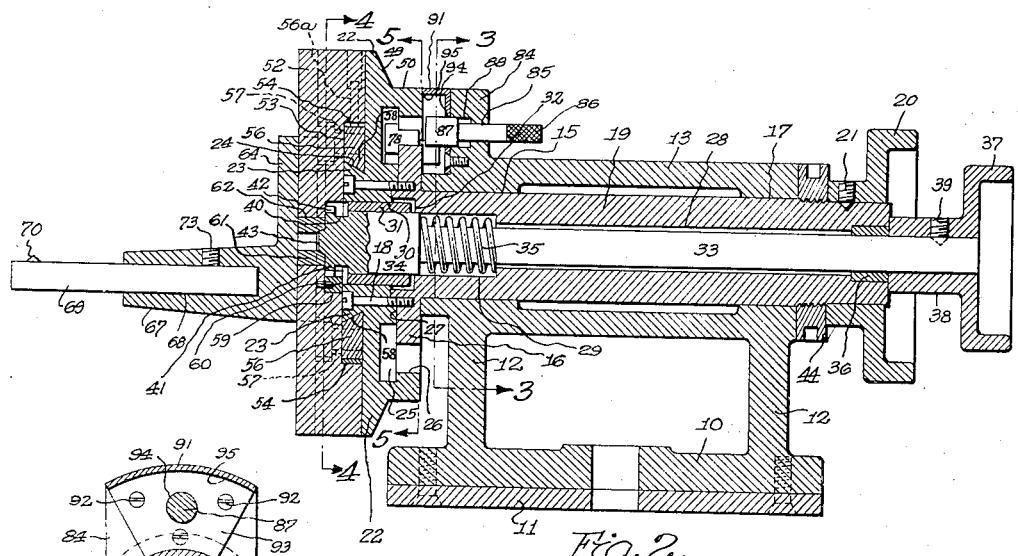
Figure 2 is a longitudinal cross sectional view taken on line 2—2 of Figure 1 looking in the direction of the arrows illustrating the details of construction and the general arrangement of parts.

One end of the tubular spindle support 13 is provided with a reduced opening 15 while the opposite end of the tubular spindle support is likewise provided with a reduced opening 17 to provide bearing portions at each end of the spindle support 13. Rotatably mounted in the bearing portions 15 and 17 is a tubular shaft 19 projecting beyond the bearing portion 17 and having attached thereto a knurled thumb wheel 20 secured in place by means of a suitable set screw 21. Formed integral with the opposite end of the tubular spindle 19 is an annular flange 16 to which is bolted as at 18 a rotary tool carrier head 22 which is of circular formation and is provided with a diametrically extending dove-tailed rib 23 having undercut longitudinal edges 24. Also formed in the rotary head 22 is an annular groove 25 having an inwardly directed flange 26 in opposed relation to the annular flange 16 and said rotary head 22 is further cut away as at 27 to receive the annular flange 16. The bolts 18 extend through suitable openings in the rotary head 22 so that the threaded ends may be received in the annular flange 16 and securely fasten the head thereto as shown in Figure 2. Coextensive with the bore 28 of the tubular shaft 19 is an enlarged bore 29 in alinement with a similar bore 30 formed in the rotary head 22. The bore 30 is provided with a bearing 31 which is sweated in the bore and said bearing extends into a cutaway portion 32 formed in the annular flange 16. Slidably mounted in the tubular shaft 19 is an operating shaft 33 having an enlarged head 34 which is in registry with the enlarged bore 29 so that a portion thereof will project thereinto. A coil spring 35 is received in the bore 29 so that it will abut one end of the bore while the opposite end of the spring will engage the enlarged head 34. The opposite end of the shaft 33 is mounted in a bearing 36 in the end of the tubular shaft 19 and projects therebeyond so that a knurled hand wheel 37 may have its hub 38 fastened in place by a set screw 39. The enlarged head 34 is reduced as at 40 and is formed with a pinion 41 having gear teeth 42 and a centrally located projection 43. A collar 44 is threaded on the tubular shaft 19 to securely hold the same in place and prevent endwise movement thereof.

Threaded in an opening 46 formed in the tubular support 13 is an adjusting screw 47 having a knurled hand piece 48 to allow the tubular spindle 19 to be locked in any desired adjusted position during certain cutting operations.

It is to be noted that the rotary head 22 is cut away as at 49 to provide a drum portion 50. Slidably mounted upon the dove-tailed rib 23 is a tool carrier head 52 which is also circular in shape and is of substantially the same diameter as the rotary head 22. The tool carrier head 52 is provided with a transverse cutaway portion 53 having parallel walls 54 in opposed relation. Mounted against each of the walls 54 is a wear block 56 held in place by means of suitable screws 57 so as to prevent displacement of the wear plate 56. One of the wear blocks 56 may be adjusted by means of adjusting screws 56a while the other block may be shimmed accordingly so as to center the head 52 relative to the rotary head 22. Each of the wear plates 56 is provided with a beveled edge 58 which is adapted to cooperate with the undercut dove-tailed rib 23 so as to allow free sliding movement of the tool carrier head 52 on the rotary head 22.

Intermediate the ends of the diagonal cutaway portion 53 is formed an enlarged recess 59 which likewise extends diametrically of the head 52 and is provided with a rack bar 60 held in place by suitable dowel pins similar to the wear plates 56. The rack bar 60 is adapted to be engaged by the gear teeth 42 when the enlarged head 34 is projected under the tension of the coil spring 35 so that rotation of the knurled handpiece 37 will effect relative sliding movement of the head 52 relative to the rotary head 22.

The projection 43 is adapted to enter a collar 61 mounted in an opening 62 centrally formed in the rotary tool carrier 52 so that the projection 43 will interlock in the tubular member 61 to hold the head 52 and rotary head 22 in alinement. Upon withdrawing the knurled handpiece 37 against the action of the coil spring 35, the projection 43 is withdrawn from the tubular member 61 so that the rotation of the handpiece 37 will effect sliding movement of the head 52 with respect to the rotary head 22.

Formed integral with the tool carrier head 52 is a dove-tailed rib 63 upon which is slidably mounted a tool carrier slide 64. The slide is provided with a wear plate 65 which is adapted to clampingly engage the rib 63 and in order to accomplish the clamping action, a screw 66 is threaded in an opening in the slide adjacent each end thereof so that the inner end will engage the wear plate 65 and lock the slide 64 against a longitudinal movement thereon. Formed integral with the slide 64 is a tubular projection 67 having a bore 68 for receiving the shank 69 of a cutting tool having a suitable diamond point 70. The diamond point 70 may be formed in the end of the tool shank 69 in which case an adapter such as is shown in Figure 10 as at 71 may be employed and said adapter is provided with a shank portion 72 extending into the bore 68 and is held in place by a set screw or the like 73. The adapter 71 is provided with a transverse bore 74 for receiving a cutting tool 75 in which the diamond point 76 is located directly in the end of the tool. A set screw 77 is provided for anchoring the shank of the tool 75 in the adapter 71.

Slidably mounted in the circular groove 25 is a pair of identically formed arcuately curved plates 78 as shown in Figure 5 and each of the plates is provided at one end with a pin 79 projecting between the annular flange 26 and the annular flange 15 so that said pin 79 may form a stop for the rotary head 22 within the limits of a predetermined arc. The opposite end of each arcuate plate 78 is provided with a threaded boss 80 adapted to receive a machine screw 81 so as to clamp a washer 82 in position and lock the plate 78 against circular movement in the slot 25. The washer 82 bears against the outer walls of the annular flanges 15 and 26.

Formed integral with the tubular housing 13 is a projection 84 having a bore 85 for receiving a sliding pin 86. The inner end of the pin is enlarged as at 87 and is retractable into an enlarged bore 88 coextensive with the bore 85. The enlarged head 87 is adapted to project into the path of the adjustable stop pin 79 so that the head may be swivelled within the limits of a predetermined arc.

Figure 3:
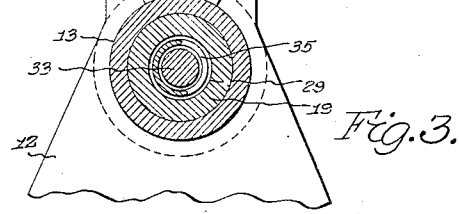
Figure 3 is a vertical cross sectional view taken on line 3—3 of Figure 2 looking in the direction of the arrows illustrating the manner in which the vernier scale is positioned in place.

The surface of the circular drum portion 50 of the rotary head 22 is graduated as at 89 by a series of degree markings in multiples of ten, and it is intended to graduate the drum portion from the zero marking 90 in each direction to 180°. Secured to the projection 84 is a vernier scale 91 fastened in place by suitable screws 92 and said scale includes a sector-shaped base 93 adapted to be positioned as shown in Figures 2 and 3 so that an opening therein as at 94 may accommodate and allow the passage of the enlarged head of the stop pin. The graduated portion of the vernier scale 91 is arcuately flanged as at 95 and said vernier scale is provided with markings 96 in multiples of 15 minutes. In actual practice the scale 89 will be divided by secondary degree marks between the numerals representing the degrees in multiples of ten so that when the head 22 is rotated to the right or left the first degree markings on the drum portion 50 registering with the first minute marking on the vernier scale 91 will indicate variances of five minutes.

In operation, the tool may be presented to a grinding wheel W as shown in Figure 8 so that the diamond point 70 and the tool 69 will engage the periphery to cut angular walls X and Y which are produced by shifting the head 52 by means of the knurled handpiece 37. In order to round the apex of the angular walls X and Y, the head 52 is rotated after being centered by the projection 43 by simply turning the knurled handpiece 20. It is intended to position the cutting tool as shown in Figure 7 so that the diamond point 70 is in alinement with a perpendicular extending through the axis of the grinding wheel W. In the position shown in Figures 7 and 8, various contours may be formed by the periphery of the grinding wheel by alternately shifting the handpieces 20 and 37 to produce arcuate and annular cuts respectively.

As shown in Figure 9, the grinding wheel W has been dressed with a straight grinding surface and this is accomplished by presenting the tool to the grinding surface or periphery of the wheel and then locking the head 22 so that the rib 23 is exactly horizontal. After the head 22 has been locked in this position by means of the set screw 47, the handwheel 37 may be withdrawn against the action of the coil spring 35 so as to release the projection 43 and allow the rotation of the spindle 33 with the resultant shifting of the tool carrier head 52 in a horizontal plane.

It is to be understood that various contours may be formed on the peripheral surface of grinding wheels by alternately shifting and rotating the knurled handpieces 20 and 37 which are so located as to be within easy reach of the operator and controllable by both hands of the operator from a single point. The tool may be manipulated by the operator grasping the handwheel 20 with the left hand and by grasping the handwheel 37 with the right hand so that a compound movement may be applied to the cutting tool by simultaneously sliding and rotating the tool supporting head 52.

While a specific embodiment of the invention has been described and illustrated, it will be understood that various modifications may be made within the scope of the appended claims without departing from the spirit of the invention.

What I claim is:

1. A tool holder comprising a base having a tubular spindle bearing, a tubular spindle rotatably mounted in said bearing, a rotary head supported by said spindle, stop elements adjustably secured to said head for limiting rotational movement thereof about a predetermined arc, a sliding head movable over the axis and diametrically with respect to the rotary head, a rack bar carried by the sliding head, a manual control shaft extending through the tubular spindle, a pinion on the end of said shaft in mesh with said rack bar, means carried by the pinion for interlockingly connecting the sliding and rotary heads, and a tool carrier support adjustably secured to the sliding head to move in a direction at right angles to the movement of the sliding head.

2. A tool holder comprising a base having a tubular spindle bearing, a tubular spindle extending through said bearing, a rotary head carried by one end of the spindle, a handwheel on the opposite end of said spindle, adjustable stop elements carried by the head to limit rotational movement thereof, a sliding head carried by the rotary head movable diametrically thereof, a spindle extending through the tubular spindle, a hand wheel on one end of said spindle adjacent the first-mentioned hand wheel, a pinion carried by the opposite end of the spindle projecting into a groove in the sliding head, a rack bar mounted in the groove in mesh with the pinion, a projection formed on the pinion adapted to be movably received in an opening in the groove to lock said sliding head and rotary head in axial alignment, and a tool carrier supported on the radial face of the sliding head.

3. A tool holder comprising a base having a tubular spindle bearing, a tubular spindle extending through said bearing, a rotary head carried by one end of the spindle, a hand wheel on the opposite end of said spindle, adjustable stop elements carried by the head to limit rotational movement thereof, a sliding head carried by the rotary head movable diametrically thereof, a spindle extending through the tubular spindle, a hand wheel on one end of said spindle adjacent the first-named hand wheel, a pinion carried by the opposite end of the spindle projecting into a groove in the sliding head, a rack bar mounted in the groove in mesh with the pinion, a projection formed on the pinion adapted to be movably received in an opening in the groove, a coil spring for urging said projection into said opening to lock said sliding head and rotary head in axial alignment, and a tool carrier supported on the radial face of the sliding head.

4. A tool carrier comprising a spindle support, a tubular spindle extending through the support having one of its ends annularly flanged, a rotary head secured to said flange having an annular recess, said flange cooperating with the recess to provide a restricted and reduced annular slot portion, a pair of stop members slidably mounted in the recess and projecting through the restricted portion thereof, means for securing the stop members in a predetermined position within said recess, a retractible stop pin carried by an extension on the spindle support adapted to be engaged by the stop members carried by the rotary head to limit rotational movement thereof about a predetermined arc, a slide mounted in the rotary head, means for moving the slide diametrically of the rotary head and a tool support on said slide.

5. A tool carrier comprising a spindle support, a tubular spindle extending through the support having an annular flange on one end thereof, a rotary head having an annular groove secured to said flange whereby said flange and said annular groove will cooperate to provide a restricted annular groove portion, stop members adjustably mounted in said groove having a projection extending through the restricted portion, a retractible stop member carried by the spindle support in the path of said first mentioned stop members, a slide mounted on said rotary head, a tool adjustably supported on the slide, means for rotating the rotary head, and independent means for operating said slide.

6. A tool carrier comprising a spindle support, a tubular spindle extending through the support having an annular flange on one end thereof, a rotary head secured to the flange having an annular groove into which said flange projects to provide a circular restricted groove, adjustable stop members slidably mounted in the annular groove and extending through the restricted portion thereof, a retractible stop mounted on the spindle support in the path of said adjustable stop members, a slide movable diametrically with respect to the rotary head, a shaft extending concentrically through the tubular spindle, a rack and gear connection between the slide and shaft, means for urging the rack and gear connection into an operative position, and hand wheels on the tubular spindle and rotary shaft located in juxtaposition to facilitate independent movement of the rotary and sliding heads.

7. A tool carrier comprising a base, a vertical support extending upwardly from the base having a horizontal bearing portion, a tubular spindle extending through and journaled in said bearing portion, a rotary disc-like head on one end of the tubular spindle, adjustable stop elements carried by the head, a stop member carried by an extension on the vertical support adapted to engage the adjustable stops for limiting rotational movement of said rotary head about a predetermined arc, a slidable tool carrier head movable diametrically across the axis of the rotary head, a cutting tool holder on said tool carrier head having an axially extending bore, a manual operating knob on the opposite end of the tubular spindle, a shaft extending through the tubular spindle having a pinion on one end thereof for engaging a rack bar on the sliding head and a control knob mounted on the other end of said shaft in spaced side by side relationship with the manual operating knob, said operating and control knobs being remotely positioned from the rotary and sliding head and selectively operable for causing rotational movement of the rotary head and sliding movement of the sliding head.

8. A tool carrier comprising a base, a bearing support carried by the base extending upwardly therefrom having a horizontal bearing portion, a tubular spindle journalled in said horizontal bearing portion, a rotary disc-like head on one end of said tubular spindle, a sliding head carried by the rotary head, a cutting tool holder having an axially extending bore for receiving a cutting tool on said sliding head, said sliding head being adapted to move over the radius of the rotary head, a rack bar secured to the sliding head, a tool carrier adjustably positioned upon the slidable head and movable in a direction at right angles thereto, a manual control wheel on the opposite end of the tubular spindle remote from the rotary head, a control shaft extending through the tubular spindle, a pinion on one end of said control shaft meshing with said rack bar for operatively connecting the control shaft with the sliding head, a control knob on the opposite end of the control shaft in spaced side by side relationship with the manual control wheel on the tubular spindle, said control knob and manual control wheel being selectively operable for moving the respective heads to various positions of adjustment, adjustable stops carried by the rotary head, a stop member mounted on the bearing support adapted to alternately engage said adjustable stops for limiting rotational movement of said rotary head about a predetermined arc, and means engaging the tubular spindle for locking the rotary head in an adjusted position whereby said tool carrier may be alternately rotated within the limits of the adjustable stops by manipulation of the control wheel and moved in a straight line path by manipulation of the spindle locking means and control knob.

9. A tool carrier comprising a base, a vertical spindle support at each end of the base having horizontal bearing portion, a tubular spindle journalled in the horizontal bearing portions, a disc-like rotary head on one end of the tubular spindle having peripheral graduations, a sliding head mounted on and movable over the axis of the rotary head, a shaft extending through the tubular spindle having a rack and gear connection with the sliding head at one end thereof, manual control knobs on the opposite ends of the tubular spindle and shaft mounted in spaced side by side relationship for independently operating the sliding head and disc-like rotary head, said manual control knobs being selectively operable for causing rotation of the disc-like head and sliding movement of the sliding head, means engaging the tubular spindle for locking the rotary head in an adjusted position, means for locking the sliding head in a centered position relative to the rotary head, and selectively operable means carried by the rotary head for limiting rotational movement thereof about a predetermined arc whereby said rotary head may be rotated by manipulation of one of said control knobs within the limits of said selectively operable limiting means to move said disc-like rotary head in said predetermined arc, and may be moved to a position of adjustment by manipulation of the same control knob and held by the tubular spindle engaging locking means while the other control knob may be manipulated to cause said sliding head to move in a straight line path in the direction of said position of adjustment.

10. A radius dresser for grinding wheels comprising a base, a bearing support extending upwardly from said base at each end thereof, a tubular spindle supported by said bearing supports, a rotary disc-like head on one end of the tubular spindle, a manual control knob at the opposite end of the tubular spindle for rotating said head, a sliding head mounted for diametrical movement on the disc-like rotary head adapted to traverse the axis thereof, a shaft extending through the tubular spindle having a rack and gear connection with the sliding head at one end thereof, a manual control knob on the opposite end of said shaft in spaced side by side relationship with the first-mentioned manual control knob, and means engaging the tubular spindle for locking the rotary head in an adjusted position, said locking means and manual control knobs being located in juxtaposed relation to facilitate easy manipulation thereof.

11. A grinding wheel dressing tool holder comprising a base, an upstanding bearing support on the base, a tubular spindle extending through and rotatably journaled in said bearing support, a rotary disc-like head at one end of the tubular spindle, a sliding tool supporting head on the rotary head adapted to slide diametrically over the axis thereof, a shaft extending through the tubular spindle having one end operatively connected to the sliding head to cause diametrical movement thereof upon rotation of said shaft, a control knob mounted on the opposite end of the tubular spindle, a control knob mounted on the opposite end of the shaft in side by side spaced relationship with the control knob on the tubular spindle, said control knobs being at a location remote from said rotary and sliding heads, means for locking the sliding head in a centered position relative to the rotary head, and means engaging the tubular spindle for locking the rotary head in an adjusted position against rotation.

12. A tool carrier comprising a base having a surface plate on the bottom thereof, a vertical support formed integral with the base and extending upwardly therefrom having a horizontal bearing portion, a tubular spindle journalled in and extending through the horizontal bearing portion, a rotary disc-like head mounted on one end of the tubular spindle to rotate therewith, circumferentially adjustable stops carried by the rotary head adapted to engage a selectively operable stop carried by the vertical bearing support for limiting rotational movement of the rotary disc-like head between said adjustable stops and about a predetermined arc, a slidable tool-carried head mounted on the rotary disc-like head capable of diametrical movement across the axis of said disc-like head, a shaft extending through the tubular spindle having a rack and gear connection with the sliding head for reciprocating the sliding head upon rotation of said shaft, a hand wheel on the opposite end of said shaft remote from said rack and gear connection, a hand wheel carried by the tubular spindle in side by side relationship with the first-mentioned hand wheel for rotating the rotary disc-like head, and a manually operable locking member carried by the vertical bearing support selectively engageable with the tubular spindle for locking the rotary head in an adjusted position.

13. A tool carrier comprising a base having a vertically extending bearing support with a horizontal bearing portion in the upper end thereof, a tubular spindle journalled in said horizontal bearing portion to rotate therein, a rotary head supported on one end of the tubular spindle, circumferentially adjustable stop members carried by the rotary head on one face thereof, a stop member mounted on an extension formed on the vertical bearing support selectively engageable with said circumferentially movable and adjustable stop members for limiting rotational movement of said head about a predetermined arc, a slidable tool carrier head supported on ways carried by the rotary head for diametrical sliding movement over the axis thereof, a rotary shaft extending through the tubular spindle, a pinion mounted on one end of said shaft, an operating hand piece on the opposite end of said shaft, a rack bar carried by the sliding head in mesh with said pinion, a cutting tool projecting axially from and carried by the slidable head, a hand wheel on the tubular spindle in spaced side by side relationship with the handpiece, said hand wheel and hand piece being manually and selectively operable at a point remote from the cutting tool to individually facilitate rotary movement of the rotary head and sliding movement of the sliding head, means for locking the sliding head in a centered position relative to the rotary head and means selectively engageable with the tubular spindle for locking said rotary head in an adjusted position.

EDWIN V. STATIA, Sr.